United States Patent
Ryan et al.

(10) Patent No.: US 7,461,860 B2
(45) Date of Patent: Dec. 9, 2008

(54) APPARATUS AND METHOD FOR PROVIDING COMBUSTIBLE GAS INFLATOR

(75) Inventors: Shawn G. Ryan, Dayton, OH (US);
Bryan T. Waid, Kettering, OH (US);
Charles M. Woods, West Manchester, OH (US)

(73) Assignee: Delphi Technologies, Inc., Troy, MI (US)

( * ) Notice: Subject to any disclaimer, the term of this patent is extended or adjusted under 35 U.S.C. 154(b) by 442 days.

(21) Appl. No.: 10/851,390

(22) Filed: May 21, 2004

(65) Prior Publication Data

US 2005/0258625 A1 Nov. 24, 2005

(51) Int. Cl.
*B60R 21/26* (2006.01)
*B65B 31/00* (2006.01)

(52) U.S. Cl. .......................... 280/741; 280/737; 53/403; 53/404

(58) Field of Classification Search ................. 280/737, 280/741; 137/68.13; 53/403, 404; 222/3, 222/5
See application file for complete search history.

(56) References Cited

U.S. PATENT DOCUMENTS

| | | | |
|---|---|---|---|
| 5,029,730 A | 7/1991 | Kostecki et al. | |
| 5,673,933 A * | 10/1997 | Miller et al. | 280/736 |
| 5,742,030 A * | 4/1998 | Booker et al. | 219/158 |
| 5,803,492 A | 9/1998 | Rink et al. | 280/737 |
| 6,155,600 A | 12/2000 | Reynolds et al. | 280/741 |
| 6,382,456 B1 * | 5/2002 | Onishi et al. | 220/581 |
| 6,543,806 B1 | 4/2003 | Fink | 280/737 |
| 2002/0113420 A1 * | 8/2002 | Neunzert et al. | 280/736 |

(Continued)

FOREIGN PATENT DOCUMENTS

DE 41 07 845 9/1992

(Continued)

OTHER PUBLICATIONS

European Search Report dated Jul. 6, 2005.

(Continued)

*Primary Examiner*—Kevin Hurley
*Assistant Examiner*—George D. Spisich
(74) *Attorney, Agent, or Firm*—Douglas D. Fekete

(57) ABSTRACT

A combustible gas inflator and a method for filling and sealing the inflator are provided. The inflator includes an enclosure configured to receive and store the combustible gas under pressure. The enclosure has an outer wall comprising an exterior surface, an interior surface, and a fill aperture extending therethrough. The fill aperture has a first aperture portion and a second aperture portion. The first aperture portion is proximate the exterior surface and the second aperture portion is proximate the interior surface, wherein the first aperture portion is larger than the second aperture portion. The inflator further includes a sealing member configured to seal the fill aperture. The sealing member has a first portion and a second portion. The first portion is configured to sealingly engage a portion of the second aperture portion and the second portion is configured to sealingly engage a portion of the first aperture portion. The first portion seals the combustible gas within the enclosure and the second portion is configured to be welded to the enclosure by a welding process that would ignite the combustible gas if the combustible gas were exposed to the welding process.

19 Claims, 11 Drawing Sheets

U.S. PATENT DOCUMENTS

| | | | |
|---|---|---|---|
| 2003/0178829 A1* | 9/2003 | Dinsdale et al. | 280/741 |
| 2005/0040633 A1* | 2/2005 | Butler et al. | 280/737 |
| 2005/0230950 A1* | 10/2005 | Fischer et al. | 280/737 |

FOREIGN PATENT DOCUMENTS

| | | |
|---|---|---|
| EP | 0 602 862 | 6/1994 |
| EP | 1 319 558 | 6/2003 |
| EP | 1 610 052 | 12/2005 |
| FR | 2 750 939 | 1/1998 |
| FR | 2 757 119 | 6/1998 |
| JP | 2004197783 | 7/2004 |

OTHER PUBLICATIONS

European Search Report dated Jun. 2, 2006.

* cited by examiner

APPARATUS AND METHOD FOR PROVIDING COMBUSTIBLE GAS INFLATOR

FIELD OF INVENTION

The present invention relates to an apparatus and method for providing combustible gas inflator.

BACKGROUND

Air bag modules or inflatable cushions have become common in modern automobiles. An air bag module typically comprises at least an inflatable cushion and an inflator for inflating the cushion.

Combustible gas inflators have an enclosure for holding the combustible gas under pressure. The inflators generally include an initiator or squib separated from an interior of the inflator by a membrane that the initiator or squib ruptures upon activation to be in fluid communication with the combustible gas. During operation, the combustible gas is ignited by the initiator or squib to provide an expanding gas or an inflator output that is ultimately used to inflate the inflatable cushion.

During manufacture of the inflator, combustible gases as well as other inert gases are placed within the enclosure. The gases are provided to the enclosure under pressure via a fill aperture. Thereafter, the fill aperture is sealed.

Due to the combustible nature of the gases used, a sealing method is desired to prevent inadvertent combustion of the combustible gases during the sealing process. Accordingly, it is desirable to provide a sealing member that will prevent inadvertent combustion of the combustion gases during the sealing process.

SUMMARY OF THE INVENTION

A combustible gas inflator in accordance with an exemplary embodiment is provided. The inflator includes an enclosure configured to receive and store the combustible gas under pressure. The enclosure has an outer wall comprising an exterior surface, an interior surface, and a fill aperture extending therethrough. The fill aperture has a first aperture portion and a second aperture portion. The first aperture portion is proximate the exterior surface and the second aperture portion is proximate the interior surface, wherein the first aperture portion is larger than the second aperture portion. The inflator further includes a sealing member configured to seal the fill aperture. The sealing member has a first portion and a second portion. The first portion is configured to sealingly engage a portion of the second aperture portion and the second portion is configured to sealingly engage a portion of the first aperture portion. The first portion seals the combustible gas within the enclosure and the second portion is configured to be welded to the enclosure by a welding process that would ignite the combustible gas if the combustible gas were exposed to the welding process.

A combustible gas inflator in accordance with another exemplary embodiment is provided. The inflator includes an enclosure configured to receive and store the combustible gas. The enclosure has an outer wall. The outer wall has an exterior surface, an interior surface, and a fill aperture extending therethrough. The fill aperture has a first aperture portion, a second aperture portion, and a third aperture portion. The first aperture portion is proximate the exterior surface. The second aperture portion is proximate the interior surface, and the third aperture portion is disposed between the first and second aperture portions. The first aperture portion is larger than the second aperture portion and the third aperture portion, and the third aperture portion is larger than the second aperture portion. The inflator further includes a sealing member configured to seal the fill aperture. The sealing member has a first portion and a second portion. The first portion is configured to sealingly engage a portion of the second aperture portion and the second portion is configured to sealingly engage a portion of the third aperture portion. The first portion seals the combustible gas within the enclosure and the second portion is configured to be welded to the enclosure by a welding process that would ignite the combustible gas if the combustible gas were exposed to the welding process.

A method for sealing an inflator in accordance with yet another exemplary embodiment is provided. The inflator has an enclosure configured to receive and store a combustible gas. The enclosure has an outer wall, the outer wall having an exterior surface, an interior surface, and a fill aperture extending therethrough. The fill aperture has a first aperture portion proximate the exterior surface and a second aperture portion proximate the interior surface, wherein the first aperture portion is larger than the second aperture portion. The method includes inserting a first portion of a sealing member into the second aperture portion of the fill aperture and creating a press-fit seal therebetween. The first portion is inserted after the combustible gas has been stored within the enclosure, wherein the press-fit seal prevents the combustible gas from escaping from the enclosure. The method further includes welding a second portion of the sealing member to the outer wall of the enclosure by a welding process which would ignite the combustible gas if the combustible gas were exposed to the welding process, wherein a permanent seal is formed between the second portion and the outer wall.

A method for sealing an inflator in accordance with another exemplary embodiment is provided. The inflator has an enclosure configured to receive and store a combustible gas. The enclosure has an outer wall. The outer wall has an exterior surface, an interior surface, and a fill aperture has extending therethrough. The fill aperture has a first aperture portion proximate the exterior surface and a second aperture portion proximate the interior surface and a third aperture portion disposed between the first and second aperture portions. The first aperture portion is larger than the second aperture portion and the third aperture portion, and the third aperture portion is larger than the second aperture portion. The method includes inserting a first portion of a sealing member into the second aperture portion of the fill aperture after the combustible gas has been stored within the enclosure, wherein the first portion prevents the combustible gas from escaping from the enclosure. The method further includes welding a second portion of the sealing member to the outer wall proximate the third aperture portion, wherein a permanent seal is formed between the second portion and the outer wall.

A method for filling an inflator with a combustible gas and sealing the inflator in accordance with another exemplary embodiment is provided. The inflator has an enclosure configured to store the combustible gas. The enclosure has an outer wall. The outer wall has an exterior surface, an interior surface, and a fill aperture extending therethrough. The fill aperture has a first aperture portion proximate the exterior surface and a second aperture portion proximate the interior surface, wherein the first aperture portion is larger than the second aperture portion. The method includes disposing the inflator within an airtight container. The method further includes pumping the combustible gas into the airtight container to urge the combustible gas into an interior of the inflator via the fill aperture. The method further includes inserting a first portion of a sealing member into the second aperture portion of the fill aperture, wherein the first portion prevents the combustible gas from escaping from the enclosure. Finally, the method includes welding a second portion of the sealing member to the exterior surface of the enclosure, wherein a permanent seal is formed between the second portion and the exterior surface.

A method for filling an inflator with a combustible gas and sealing the inflator in accordance with another exemplary embodiment is provided. The inflator has an enclosure configured to receive and store the combustible gas. The enclosure has an outer wall. The outer wall has an exterior surface, an interior surface, and a fill aperture extending therethrough. The fill aperture has a first aperture portion proximate the exterior surface and a second aperture portion proximate the interior surface and a third aperture portion disposed between the first and second aperture portions. The first aperture portion is larger than the second aperture portion and the third aperture portion, and the third aperture portion is larger than the second aperture portion. The method includes disposing the inflator within an airtight container. The method further includes pumping the combustible gas into the airtight container to urge the combustible gas into an interior of the inflator via the fill aperture. The method further includes inserting a first portion of a sealing member into the second aperture portion of the fill aperture, wherein the first portion prevents the combustible gas from escaping from the enclosure. Finally, the method includes welding a second portion of the sealing member to the outer wall proximate the third aperture portion, wherein a permanent seal is formed between the second portion and the outer wall.

A method for filling an inflator with a combustible gas and sealing the inflator in accordance with another exemplary embodiment is provided. The inflator has an enclosure configured to store the combustible gas. The enclosure has an outer wall. The outer wall has an exterior surface, an interior surface, and a fill aperture extending therethrough. The fill aperture has a first aperture portion proximate the exterior surface and a second aperture portion proximate the interior surface, wherein the first aperture portion is larger than the second aperture portion. The method includes moving a metal fixture having a hollow interior region against the exterior surface of the outer wall to obtain a first sealing region. The hollow interior region is in fluid communication with the fill aperture. The method further includes pumping the combustible gas through a first aperture extending through the metal fixture and through the fill aperture into the interior of the enclosure. The method further includes inserting a first portion of a sealing member into the second aperture portion of the fill aperture, wherein the first portion prevents the combustible gas from escaping from the enclosure. Finally, the method includes welding a second portion of the sealing member to the exterior surface of the enclosure, wherein a permanent seal is formed between the second portion and the exterior surface.

A method for filling an inflator with a combustible gas and sealing the inflator in accordance with another exemplary embodiment is provided. The inflator has an enclosure configured to receive and store the combustible gas. The enclosure has an outer wall. The outer wall has an exterior surface, an interior surface, and a fill aperture extending therethrough. The fill aperture has a first aperture portion proximate the exterior surface and a second aperture portion proximate the interior surface and a third aperture portion disposed between the first and second aperture portions. The first aperture portion is larger than the second aperture portion and the third aperture portion, and the third aperture portion is larger than the second aperture portion. The method includes moving a metal fixture having a hollow interior region against the exterior surface of the outer wall to obtain a first sealing region, the hollow interior region being in fluid communication with the fill aperture. The method further includes pumping the combustible gas through a first aperture extending through the metal fixture and through the fill aperture into the interior of the enclosure. The method further includes inserting a first portion of a sealing member into the second aperture portion of the fill aperture, wherein the first portion prevents the combustible gas from escaping from the enclosure. Finally, the method includes welding a second portion of the sealing member to the outer wall proximate the third aperture portion, wherein a permanent seal is formed between the second portion and the outer wall.

A combustible gas inflator in accordance with another exemplary embodiment is provided. The inflator includes an enclosure configured to receive and store the combustible gas. The enclosure has an outer wall. The outer wall has an exterior surface, an interior surface, and a fill aperture extending therethrough. The fill aperture has a first aperture portion proximate the exterior surface and a second aperture portion proximate the interior surface, wherein the first aperture portion is larger than the second aperture portion. The inflator further includes a first portion configured to be press-fit into the second aperture portion to obtain a first seal, wherein the first seal prevents the combustible gas from escaping from the enclosure. Finally, the inflator includes a second portion configured to be welded to the outer wall proximate the first aperture portion to obtain a second seal, wherein the second seal is a permanent seal.

A combustible gas inflator in accordance with another exemplary embodiment is provided. The inflator includes an enclosure configured to receive and store the combustible gas. The enclosure has an outer wall. The outer wall has an exterior surface, an interior surface, and a fill aperture extending therethrough. The fill aperture has a first aperture portion proximate the exterior surface and a second aperture portion proximate the interior surface and a third aperture portion disposed between the first and second aperture portions. The first aperture portion is larger than the second aperture portion and the third aperture portion, and the third aperture portion is larger than the second aperture portion. The inflator further includes a first portion configured to be press-fit into the second aperture portion to obtain a first seal, wherein the first seal prevents the combustible gas from escaping from the enclosure. Finally, the inflator includes a second portion configured to be welded to the outer wall proximate the third aperture portion to obtain a second seal, wherein the second seal is a permanent seal.

DETAILED DESCRIPTION OF EXEMPLARY EMBODIMENTS

Figure 1:
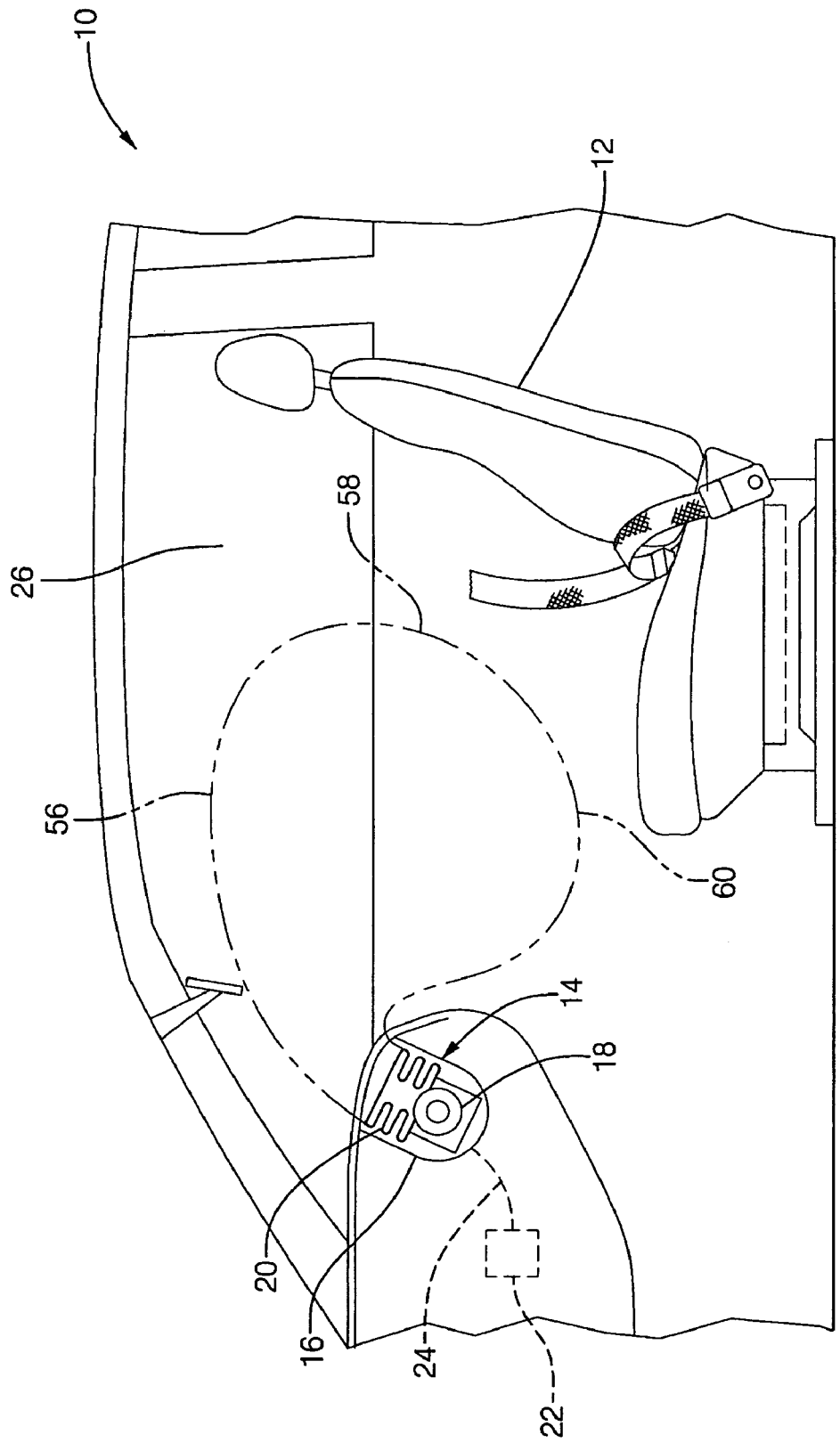
FIG. 1 is a cross-sectional view of a portion of a vehicle having an air bag module.

Referring now to FIG. 1, a portion of a vehicle 10 is illustrated. Included in an interior compartment of vehicle 10 is a seating structure 12 and an air bag module 14 disposed in a selected spatial relationship with respect to the seating structure. Air bag module 14 comprises a housing 16, an inflator 18, and an inflatable cushion 20. Module 14 is positioned in vehicle 10 for deployment of cushion 20 away from housing 16 (e.g., rearward). Inflator 18 can be a single stage inflator capable of releasing a single quantity of inflation gas into cushion 20. Alternately, inflator 18 can be a dual stage inflator, adapted to release at least two levels of inflation gas into cushion 20. The inflator 18 is a combustible gas inflator what ignites combustible gases that react with inert or non-combustible gases to provide an inflator output. In particular, a combustible gas inflator utilizes a combustible gas (e.g., hydrogen), an oxidizing agent (e.g., oxygen), and an inert gas (e.g., argon or helium) to provide an inflator output.

A sensor or sensing-and-diagnostic module 22 is adapted to detect an activation event to provide an activation signal 24 to inflator 18. The detection of the activation event can be determined by one or more sensors disposed about the vehicle. Thus, module 22 controls the activation of air bag module 14 via activation signal 24.

Cushion 20 is stored in a folded or undeployed position in housing 16, and is in fluid communication with inflator 18. Upon detection of an activation event by sensing-and-diagnostic module 22, inflator 18 is activated via signal 24 to generate an inflation gas. The inflation gas causes cushion 20 to inflate and expand from housing 16 into the interior compartment 26 of vehicle 10 as illustrated in phantom.

Figure 2:
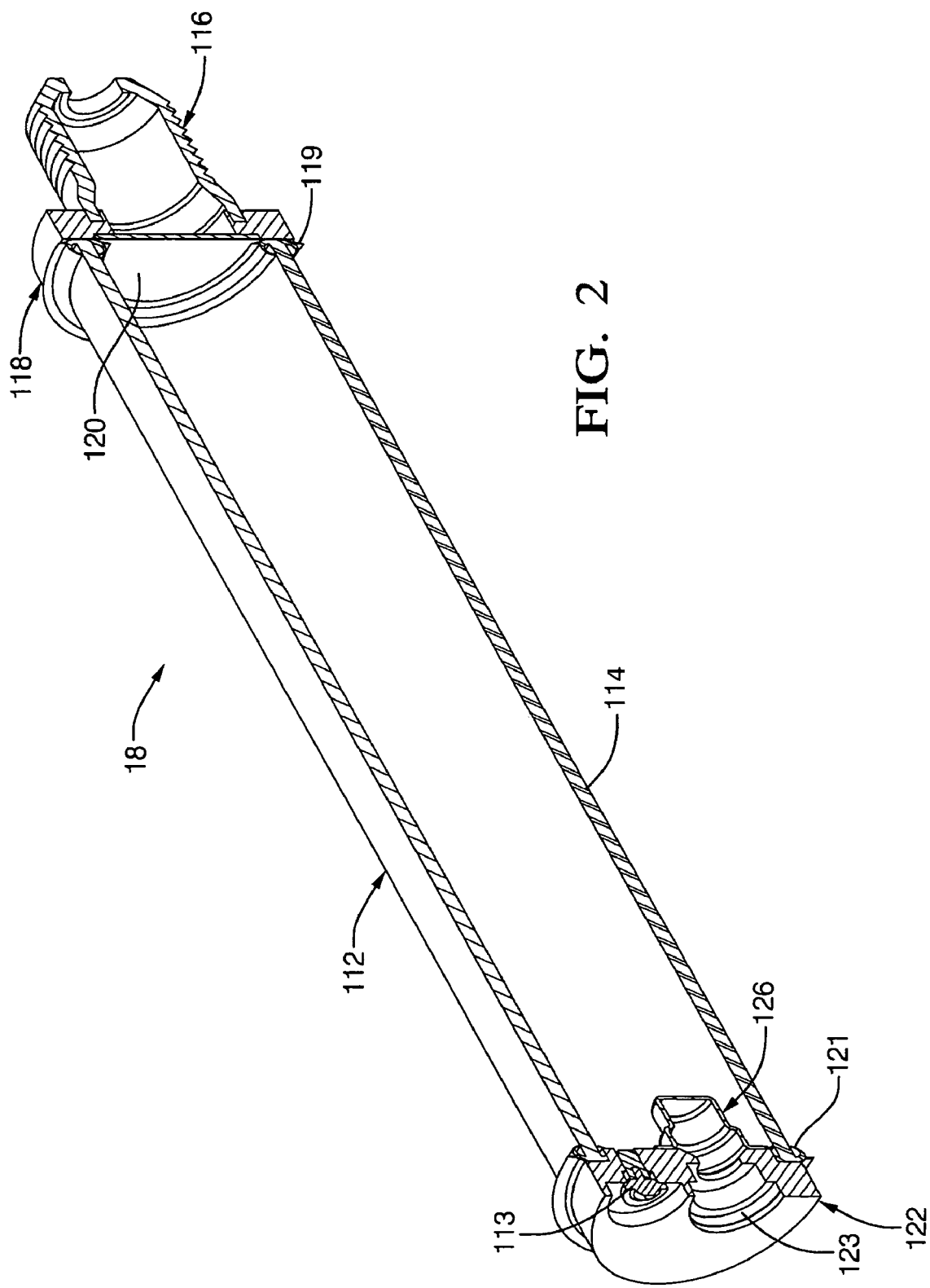
FIG. 2 is a cross-sectional view of an inflator constructed in accordance with an exemplary embodiment of the present invention.
Figure 3:
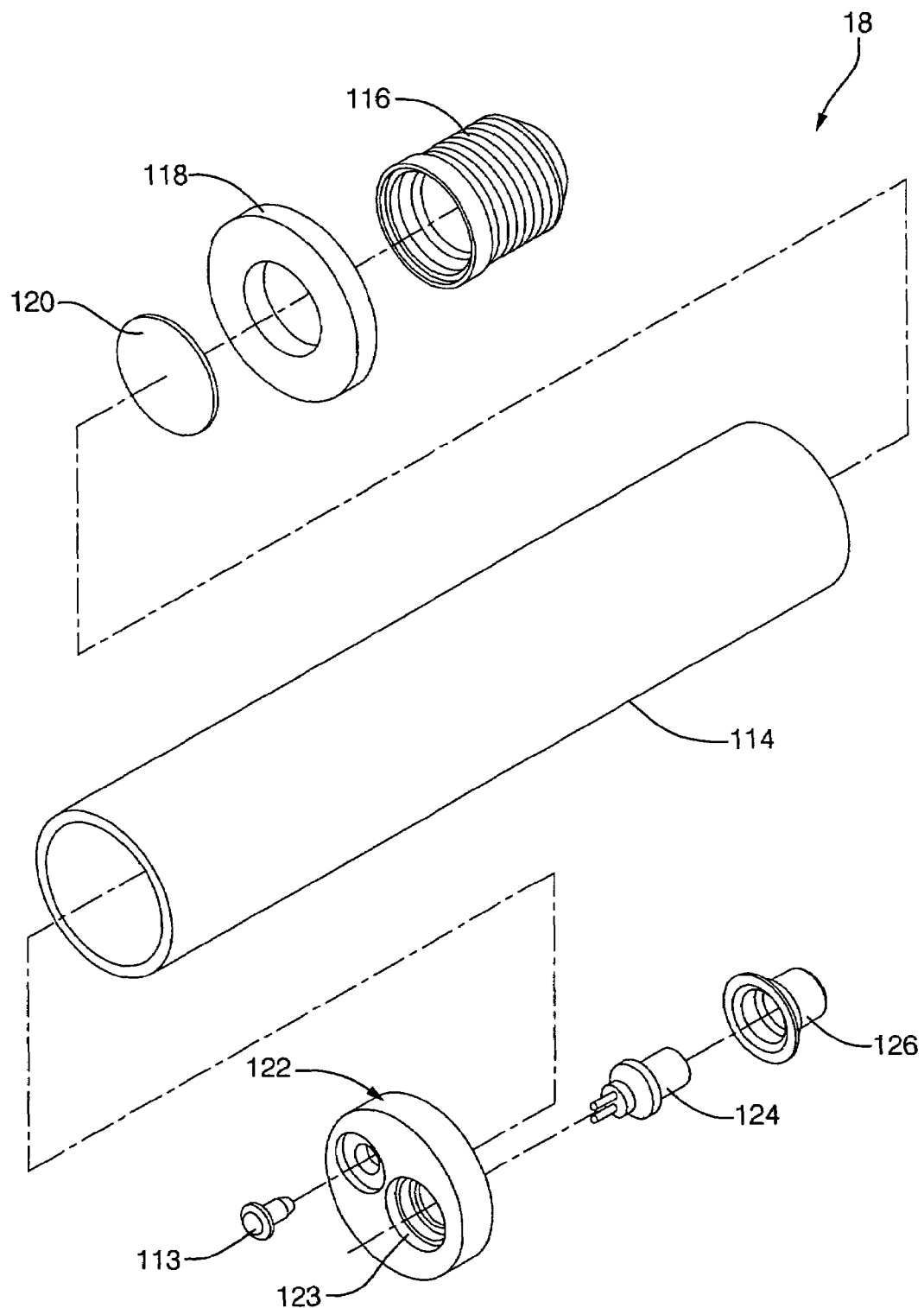
FIG. 3 is an exploded view of the inflator of FIG. 2.

Referring to FIG. 2, a detailed view of inflator 18 is illustrated. Inflator 18 includes an enclosure 112 that defines an interior volume for storing a combustible gas or in some applications an inert gas that interacts with the combustible gas to provide inflator output. The inflator output provides a means for inflating inflatable cushion 20 that is in fluid communication with the inflator 18. The inflator 18 further includes a sealing member or sealing means 113 for sealing an aperture in enclosure 112 after the enclosure 112 has been filled with a combustible gas through the aperture. In an exemplary embodiment, the inflator 18 is configured to retain at least 90% of the pressurized gases for at least 15 years by utilizing the first and second seals formed by the sealing member 113. In particular, the inflator 18 stores a combustible gas (e.g., hydrogen), an oxidizing agent (e.g., oxygen), and an inert gas (e.g., argon or helium) for at least 15 years by utilizing the first and second seals formed by the sealing member 113.

In an exemplary embodiment, enclosure 112 includes a housing portion 114, a nozzle portion 116, a nozzle endcap 118, a burst disk 120, an initiation endcap 122, an initiator 124, and an initiator sleeve 126.

Housing portion 114 is provided to hold a combustible gas, and in some applications an additional inert gas, therein when enclosed by endcap 122 and burst disk 120. In particular, housing portion 114 is enclosed at a first end by a nozzle endcap 118 and at a second end by initiation endcap 122. Housing portion 114 can be constructed from steel or a metal alloy and endcaps 118, 122 can be welded to first and second ends of housing portion 114 using a resistance welding joint.

Nozzle portion 116 is provided to direct the inflating gas from enclosure 12 into inflatable cushion 20. Nozzle portion 116 is operably coupled to nozzle endcap 118 and can be constructed from steel or a metal alloy. Nozzle portion 116 is welded to endcap 118.

Burst disk 120 is provided to enclose a first end of housing portion 114. As shown, burst disk 120 is operably coupled between an end 119 of housing portion 114 and endcap 118. Burst disk 120 is configured to break, bust, or fracture when a pressure inside enclosure 112 is larger than a predetermined pressure. When burst disk 120 breaks, the interior volume of enclosure 112 is in fluid communication with nozzle portion 116 to allow the expanding inflation gas to exit nozzle portion 116 to fill inflatable cushion 20. Nozzle endcap 118 is welded to end 119 of housing portion 114 and fixedly holds burst disk 120 against end 119 of housing portion 114.

Initiator 124 is provided to ignite a combustible gas, such as hydrogen for example, stored in enclosure 112 in response to an electrical control signal provided by sensor 22. Initiator 124 can comprise a pyrotechnic device or any other type of ignition device that can ignite the combustible gas stored in enclosure 112 in response to an electrical control signal. Initiator 124 is disposed in initiator sleeve 126 which is further disposed in an aperture 123 extending through endcap 122.

Initiator sleeve 126 is provided to hold initiator 124 within endcap 122 such that a portion of initiator 124 is in fluid communication with the gas stored in an interior of enclosure 112. Sleeve 126 extends through an orifice in endcap 122 and is fixedly welded to endcap 122.

Figure 4:
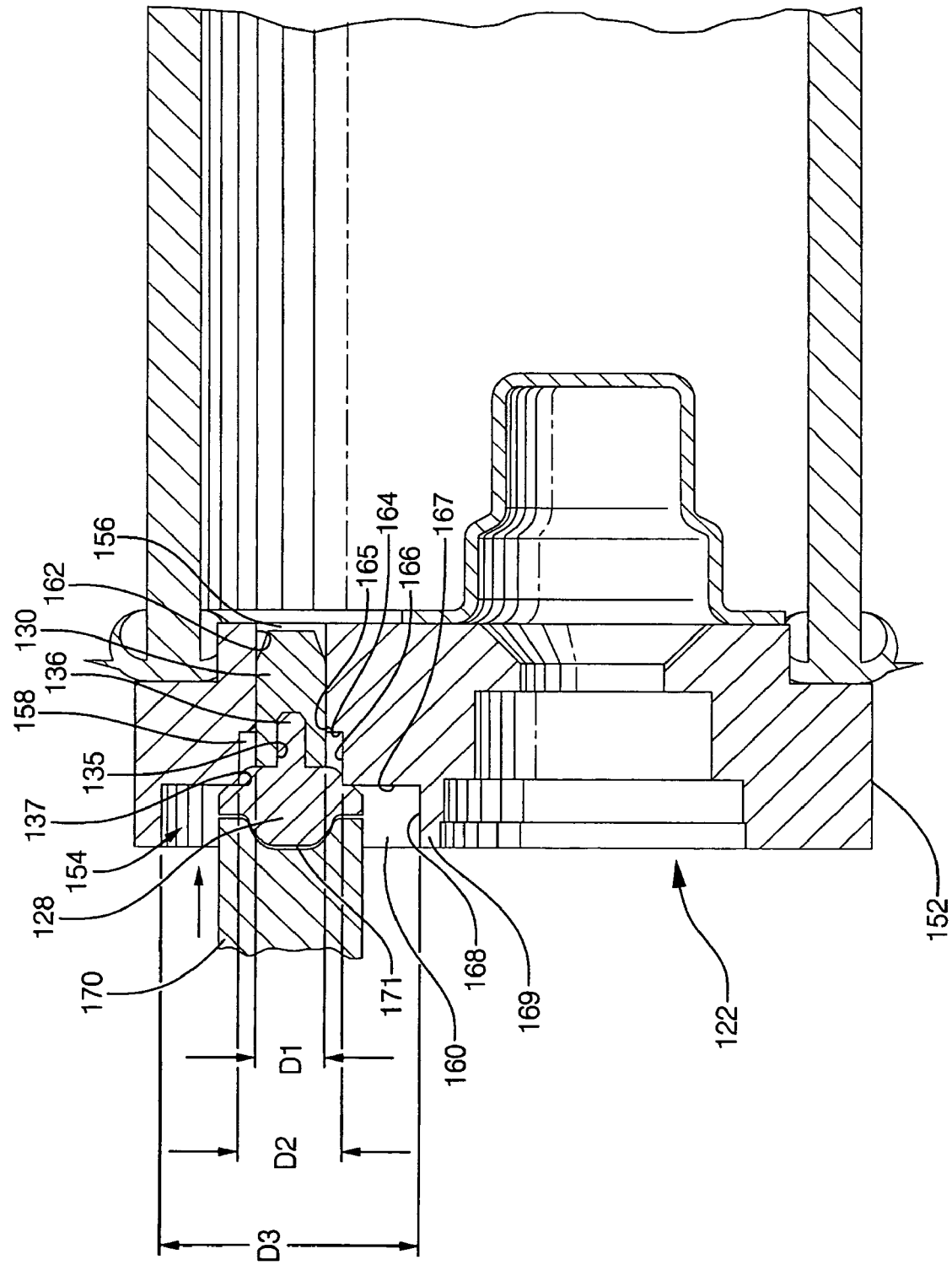
FIG. 4 is an enlarged cross-sectional view of a portion of the inflator of FIG. 2.

Referring to FIGS. 2 and 4, endcap 122 is provided to enclose a second end of housing portion 114. Endcap 122 includes a wall 152 that can be constructed from steel, a metal alloy, or other electrically conductive materials, and is operably configured to seal against end 121 of enclosure 112. Endcap 122 can be constructed from a metal such that endcap 122 can be welded to tube 112 and that a portion of sealing member 113 can be welded to endcap 122 for sealing a "fill aperture" 154 in endcap 122.

In accordance with an exemplary embodiment, wall 152 includes "fill aperture" 154 extending therethrough. Aperture 154 is utilized as a "fill aperture" for allowing a combustible gas as well as inert gases to be initially placed in enclosure 112. The combustible gas can be hydrogen gas, for example. However, other equivalent combustible gases are considered to be within the scope of the present invention.

In one exemplary embodiment, fill aperture 154 has stepped aperture portions with increasing diameters, such as an aperture portion 156 have diameter (D1), an aperture portion 158 having diameter (D2) where (D2)>(D1), and a chamfered aperture portion 165 between aperture portions 156 and 158 for allowing sealing member 113 to be easily inserted and guided within aperture 154, and an aperture portion 160 having a diameter (D3) where (D3)>(D2).

As illustrated in FIG. 4, an inner side-wall surface 162 defines aperture portion 156. An inner side-wall surface 166 and a step surface 164 define aperture portion 158. An inner side-wall surface 167 defines the chamfered aperture portion 165. An inner side-wall surface 168 and a step surface 167 defines aperture portion 160. When the sealing member 113 is inserted into the fill aperture, the first point of contact with the sealing member 113 and the wall 152 is at chamfered surface 167. Thus, any plastic removed from the sealing member 113 during insertion thereof occurs at chamfered surface 167 and not at the edge defined by the surfaces 166, 167, to allow a clean welding location for the welding joint 137.

It should be noted that the configuration or cross-sectional shape of the fill aperture 154 can be varied depending upon the desired sealing characteristics of the enclosure. For example, in an alternate exemplary embodiment, the fill aperture could be conically shaped or portions of the fill aperture could be conically shaped. In another alternate exemplary embodiment, the fill aperture could contain a plurality of additional stepped portions for sealing against a sealing member.

Figure 6:
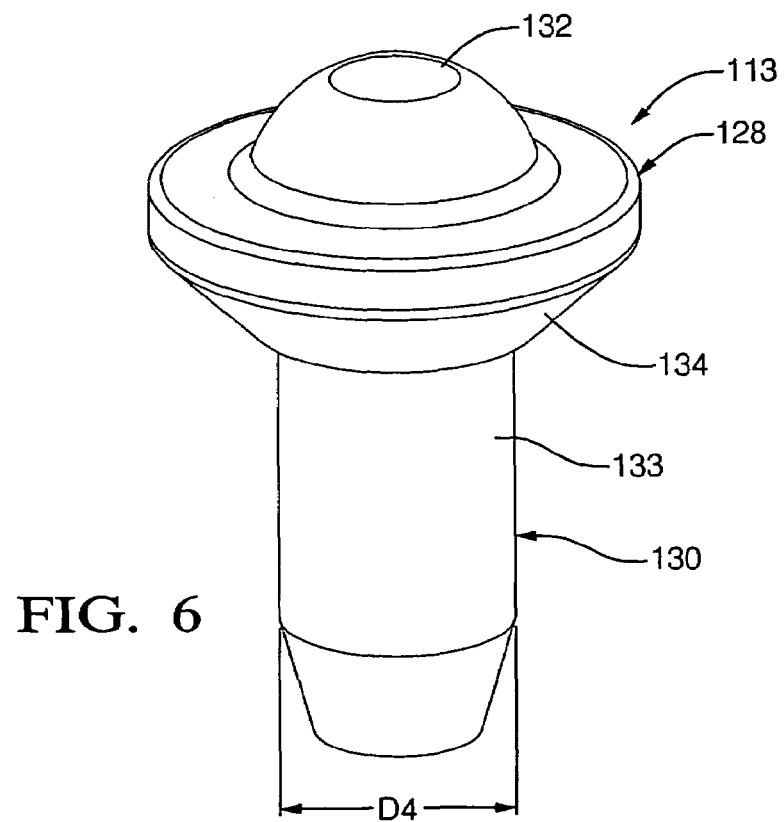
FIG. 6 is a perspective view of a sealing member used in exemplary embodiments of the present invention.

Referring to FIGS. 4 and 6, sealing member 113 is provided to seal aperture 154 of initiator endcap 122 such that enclosure 112 can store a combustible gas therein. As shown, sealing member 113 includes a head portion 128 and a sealing portion 130. The size and shape of sealing member 113 and the size and shape of each portion of sealing member 113 could be varied based on the desired sealing characteristics and on the size and shape of the fill aperture.

In an exemplary embodiment, head portion 128 is constructed from steel or another electrically conductive metal or metal alloy that will allow head portion 128 to be weldably sealed to electrically conductive wall 152 using a welding process. In one embodiment, head portion 128 includes a cup-shaped top 132, a tapered portion 134, and an extension portion 136, and a top surface 129 disposed about the cup-shaped top 132. Cup-shaped top 132 is provided to (i) receive an electrode 170 that is utilized to urge sealing member 113 into aperture 154, and (ii) to center the sealing member on the electrode 170. The top surface 129 is provided to allow axial alignment of the sealing member 113 with the electrode 170. Tapered portion 134 is provided to contact an edge defined by step surface 167 and inner sidewall surface 166 to provide a sharp interface for welding the head portion 128 to the wall 152 to improve the quality of the weld joint formed therebetween. A sealing weld 137 will be utilized for sealing head portion 128 to initiator endcap 122, as will be explained in greater detail below. Extension portion 136 extends from tapered portion 134 and is fixedly held within an aperture within sealing portion 130.

Sealing portion 130 is provided to create a press-fit seal within aperture portion 156. Sealing portion 130 can be constructed from an electrically non-conductive material such as plastic. Alternately, sealing portion 130 can be constructed from an electrically non-conductive ceramic, for example. In any embodiment, sealing portion 130 comprises a non-electrically conductive member capable of being press-fit within the smaller opening of the fill aperture. In one embodiment, sealing portion 130 includes a cylindrical portion 133 having an aperture 135 for receiving extension portion 136 of head portion 128. Sealing portion 130 further includes a tapered portion 131 that extends from portion 133 for assisting in aligning sealing portion 130 in aperture 154. The diameter (D4) of sealing portion 130 is slightly larger than diameter (D1) of aperture portion 156 for creating a press-fit seal. For example, the diameter D4 can be 0.25 mm larger than the diameter (D1). It should be noted, however, that the difference between diameter D4 and the diameter D1 can be greater or less than 0.25 mm. Thus, sealing portion 130 is press-fit within aperture portion 156 during insertion thereof. The sealing portion 130 can be coupled to the head portion 128 using a snap-fit joint, a press fit joint, or by insert molding the portion 128 and portion 130 together.

Thus, after the combustible gas has been stored within the enclosure 112, the sealing portion 130 provides a first temporary seal that prevents the combustible gas from escaping from the enclosure 112 to prevent inadvertent ignition of the combustible gas when a separate welding process is used to provide a more permanent seal. Thereafter, the head portion 128 can be welded to the wall 152 to create a permanent seal between the head portion 128 and the wall 152, without igniting the combustible gas. Moreover, the first temporary seal allows the enclosure to be repositioned, if necessary to provide the second permanent seal.

In accordance with an exemplary embodiment, sealing member 113 is recessed within aperture portion 160 below an outer surface 169 of endcap 122 will provide for a more compact profile of the enclosure 112 as compared to embodiments having the sealing member 113 disposed above an outer surface of the endcap. Of course, it is understood that the sealing member 113 may protrude above the outer surface 169.

Figure 8:
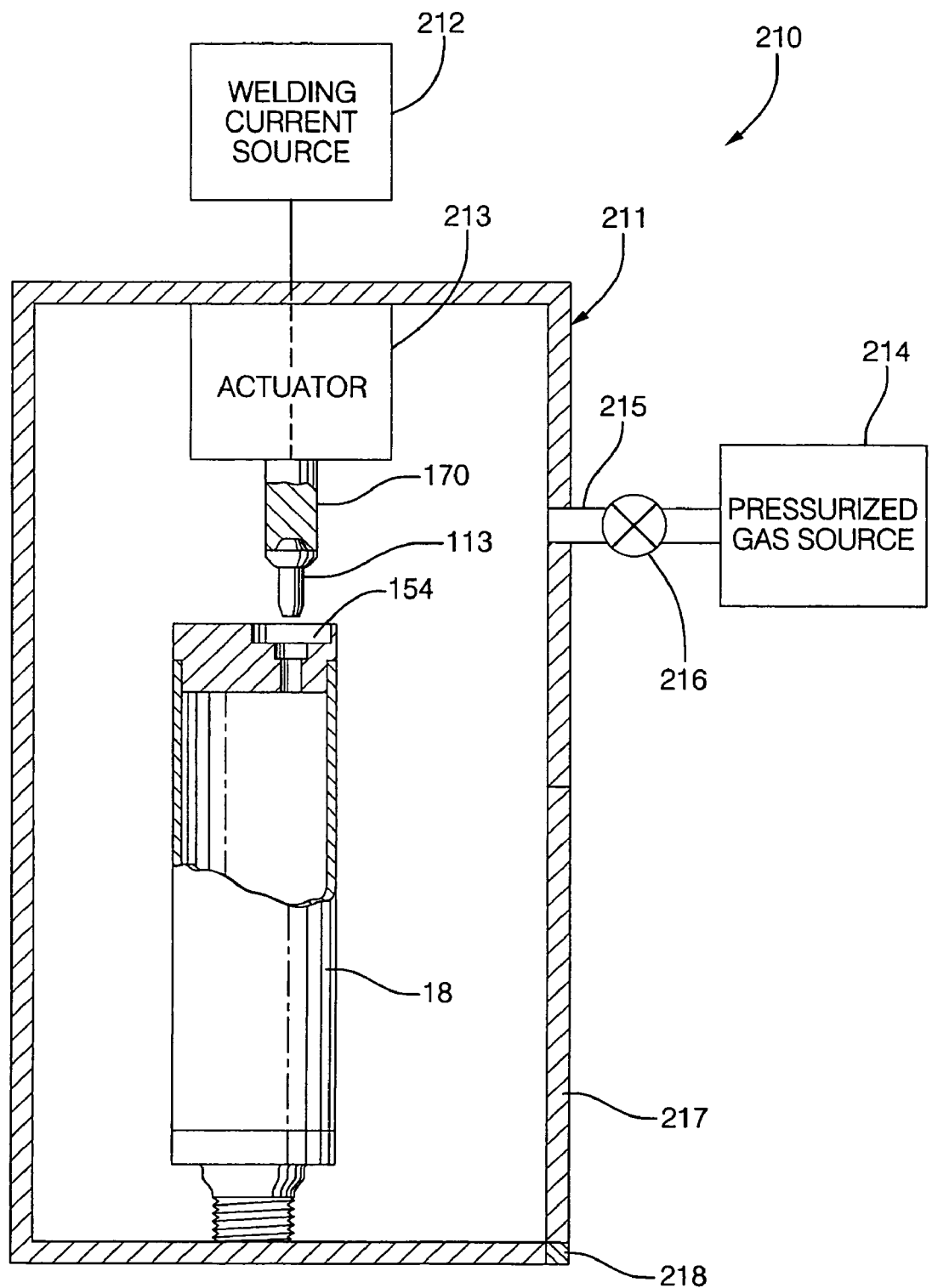
FIG. 8 is a cross-sectional view of a system for filling and sealing an inflator with a combustible gas in accordance with an exemplary embodiment of the present invention.

Referring to FIG. 8, a system 210 and method for filling an interior of inflator 18 with a combustible gas and for sealing an aperture 154 of inflator 18 in accordance with an exemplary embodiment will now be explained. As shown, system 210 includes an airtight container 211, a welding current source 212, a linear actuator 213 operably coupled to electrode 170, a pressurized gas source 214, a conduit 215, and a valve 216.

Airtight container 211 is provided to receive inflator 18 therein. Container 211 includes a door 217 that rotates about a hinge 218 to allow door 217 to move from a closed position to an open position. Thus, a user can open door 217 to dispose inflator 18 within an interior chamber of container 211. Container 211 can receive a combustible gas, such as hydrogen for example, and an inert gas from pressurized gas source 214 via conduit 215 disposed between pressurized gas source 214 and container 211. In particular, when a valve 216 disposed within conduit 215 is in an open operational position, a combustible gas and an inert gas from pressurized gas source 214 is routed into an interior of container 211. The gases can thereafter enter an aperture 154 of inflator 18 to fill an interior of inflator 18 with the gases.

As shown, linear actuator 213 may be disposed within an interior of container 211. Linear actuator 213 is provided to move electrode 170 in a linear direction. In particular, linear actuator 213 may move electrode 170 (and sealing member 113 coupled to electrode 170) in a first direction in order to move sealing member 113 into an aperture 154 of inflator 18.

Welding current source 212 is provided to route a welding current through electrode 170 to a head portion 128 of sealing member 113. By routing a welding current through head portion 128, head portion 128 can be resistance welded to a wall of inflator 18 to seal fill aperture 154, as will be described in greater detail below. The aforementioned system is but one example of a system for filling inflator 18 and other means for filling having a combustible gas under pressure could be utilized.

Figure 7:
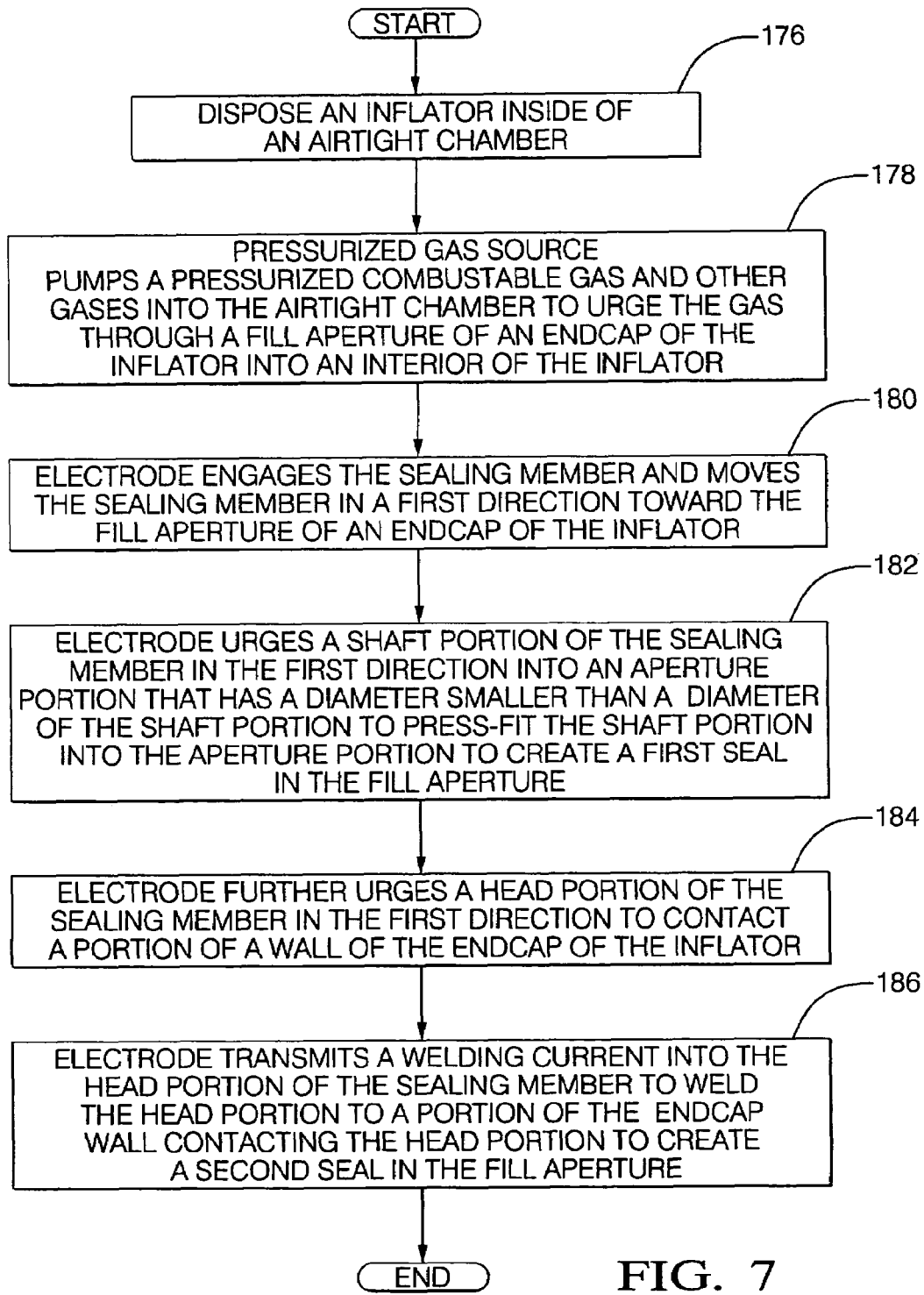
FIG. 7 is a flowchart of a method for filling and sealing an inflator with a combustible gas in accordance with an exemplary embodiment of the present invention.

Referring to FIGS. 4, 6 and 7, a method for filling an interior of inflator 18 with a combustible gas and for sealing a fill aperture 154 of inflator 18 will now be explained. The following steps are exemplary and not intended to be limiting.

At step 176, inflator 18 is disposed within airtight container 211.

At step 178, pressurized gas source 200 pumps a pressurized combustible gas through conduit 215 into airtight container 211 to urge the combustible gas through aperture 154 of endcap 122 of inflator 18. Thus, the combustible gas passes from an interior of container 211 through aperture 154 into an interior of inflator 18.

At step 180, an electrode 170 engages sealing member 113 and moves sealing member 113 in a first direction towards aperture 154. In particular, a concave surface 171 of electrode 170 engages convex shaped portion 132 of head portion 128. As discussed above, actuator 213 moves electrode 170 and sealing member 113 in the first direction.

At step 182, electrode 170 urges sealing portion 130 of sealing member 113 in the first direction into aperture portion 156 that has a diameter (D1) smaller than diameter (D4) of sealing portion 130 to press-fit the sealing portion 130 into aperture portion 156, to create a first seal or sealing region.

At step 184, electrode 170 further urges head portion 128 of sealing member 113 in the first direction to contact a portion of an electrically conductive wall 152 of endcap 122. In particular, tapered portion 134 of head portion 128 contacts an edge defined by inner side-wall surface 166 and step surface 167.

At step 186, electrode 170 transmits a welding current into head portion 128 while endcap 122 is coupled to electrical ground (not shown). In particular, welding current source 212 can route a welding current through electrode 170 to head portion 128. The welding current welds head portion 128 to wall 152 at a location where portion 128 is contacting wall 152 to create a second seal or sealing region. In particular, the welding current creates a weld joint 137 around the circumference of tapered portion 134 to seal head portion 128 to electrically conductive wall 152. Thus, the method for sealing an aperture of inflator 18 produces two seals (e.g., a press-fit seal and a weld seal) for sealing a fill aperture in inflator 18. The press-fit seal prevents inadvertent ignition of the combustible gas during the application of the weld seal that is formed by a welding process that may produce flash or sparks.

Figure 5:
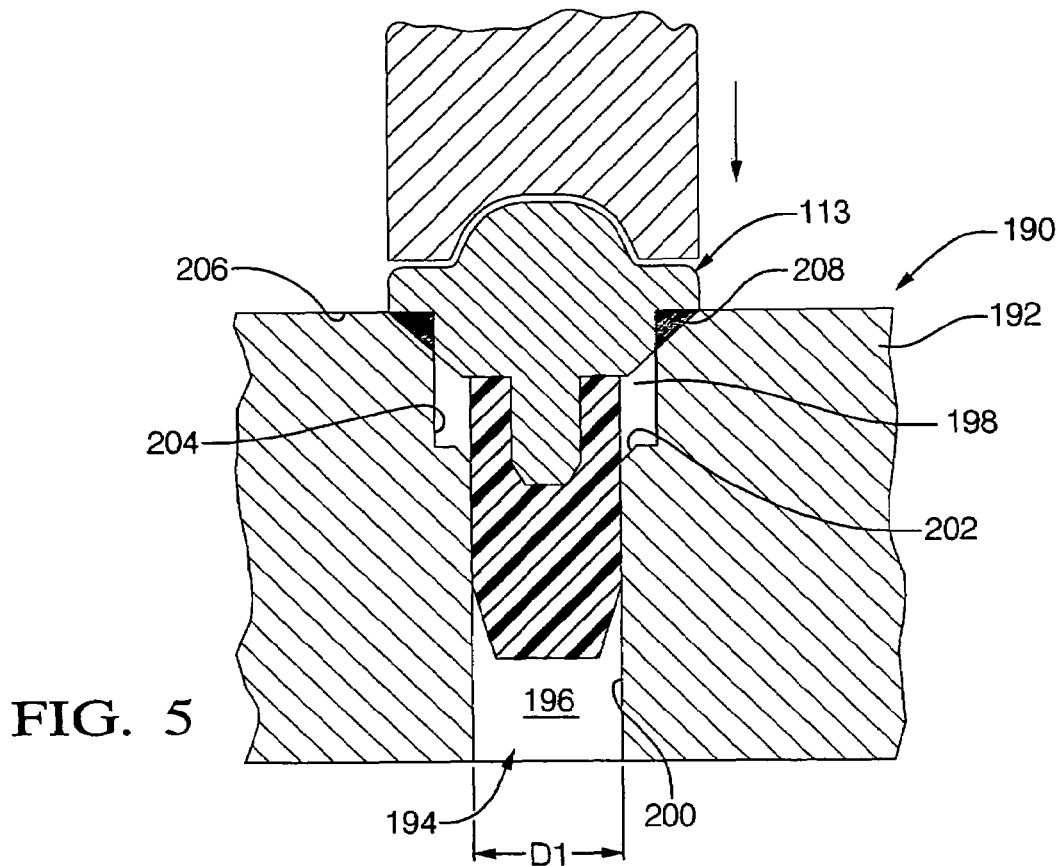
FIG. 5 is an enlarged cross-sectional view of another exemplary embodiment of the present invention.

Referring to FIG. 5, another exemplary initiator endcap (e.g. endcap 190) that can be utilized with inflator 18 is illustrated. The primary difference between endcap 190 and endcap 122 is that endcap 190 has an aperture (e.g., aperture 194) with two aperture portions having two different diameters, whereas endcap 122 has an aperture (e.g., aperture 154) with three aperture portions having three different diameters. Thus, end cap 190 is configured such that head portion 128 is disposed above an upper surface 206 of wall 192, whereas end cap 122 is configured such that head portion 128 is disposed below an upper surface 169 of wall 152.

Referring to FIGS. 5 and 6, endcap 190 is provided to enclose a second end of housing portion 114. Endcap 190 can be constructed from steel, a steel alloy or other electrically conductive materials and is operably coupled to end 121 of housing portion 114. Endcap 190 includes wall 192 configured to seal against end 121 of housing portion 114. Wall 192 includes an aperture 194 extending therethrough. Aperture 194 is utilized as a "fill aperture" for allowing a combustible gas to be pumped into an interior of enclosure 112. Aperture 194 can have stepped aperture portions with increasing diameters, such as an aperture portion 196 having diameter (D1) and an aperture portion 198 having diameter (D2), for example, for allowing alignment of sealing member 113 during insertion in aperture 194. As shown, an inner side-wall surface 200 defines aperture portion 196. An inner side-wall surface 204 and a chamfered surface 202 defines aperture portion 198. As shown, tapered portion 134 of head portion 128 is provided to contact an edge defined by side-wall surface 204 and outer surface 206. The diameter of (D4) of sealing portion 130 is slightly larger than diameter (D1) of aperture portion 196 for creating a press-fit seal. For example, the diameter D4 can be 0.25 mm larger than the diameter (D1). It should be noted, however, that the difference between diameter D4 and the diameter D1 can be greater or less than 0.25 mm. Thus, sealing portion 130 is press-fit within aperture portion 196 during insertion thereof.

It should be noted that the configuration or cross-sectional shape of the fill aperture 194 can be varied depending upon the desired sealing characteristics of the enclosure. For example, in an alternate exemplary embodiment, the fill aperture could be conically shaped or portions of the fill aperture could be conically shaped. In another alternate exemplary embodiment, the fill aperture could contain a plurality of additional stepped portions for sealing against a sealing member.

The sealing member 113 can be utilized to seal endcap 190 in a substantially similar fashion as described above with respect to assembly 130 in sealing endcap 122, except that head portion 128 of assembly 130 is welded at a wall edge defined by upper surface 206 and inner side-wall surface 204 which results in a portion of sealing member 113 being disposed above a surface 206 of endcap 190.

Figure 9:
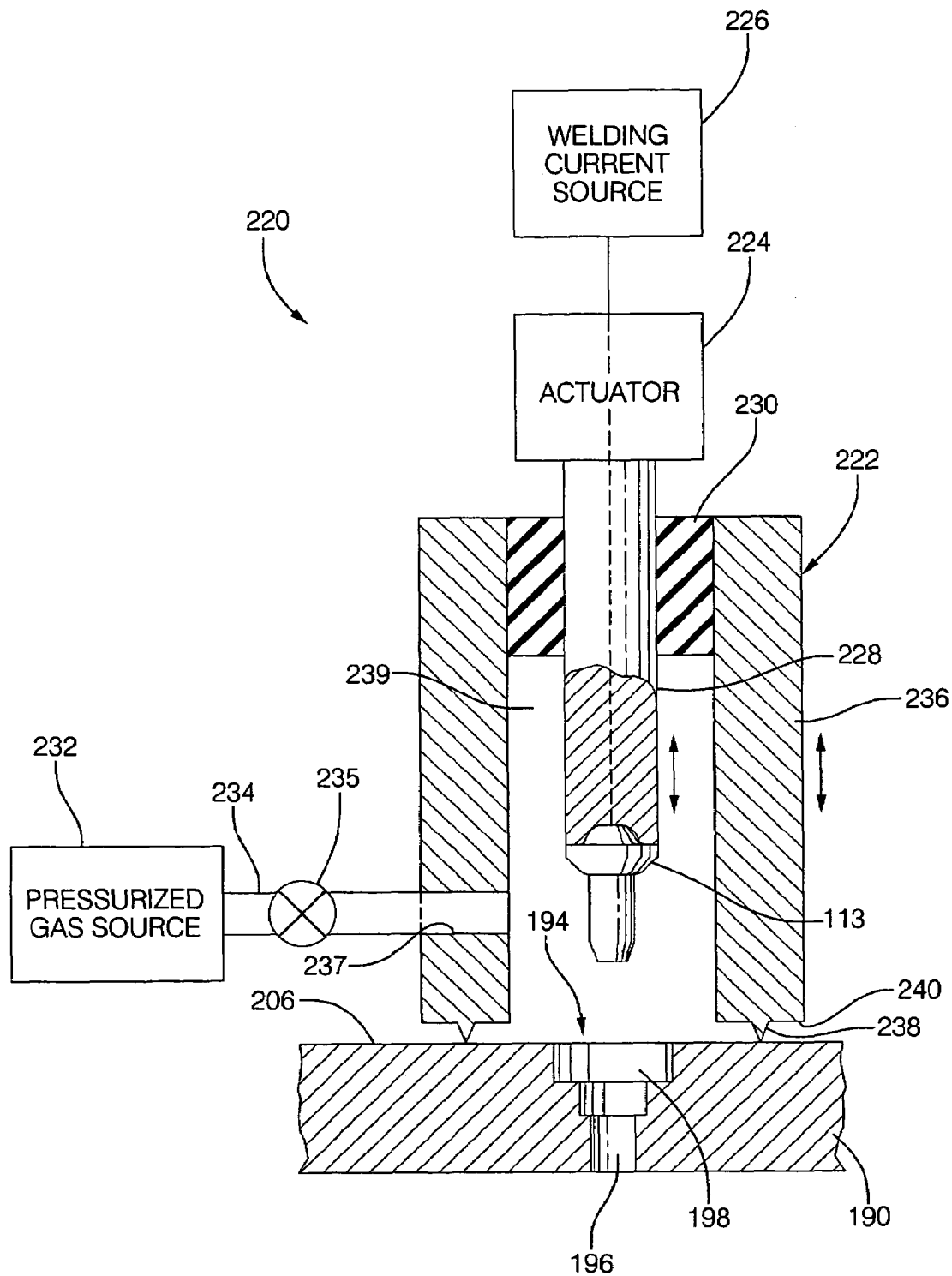
FIG. 9 is a cross-sectional view of a system for filling and sealing an inflator with a combustible gas in accordance with another exemplary embodiment of the present invention.

Referring to FIG. 9, a system 220 for filling an interior of inflator 18 with an inflation gas and for sealing an aperture 194 of inflator 18 in accordance with another exemplary embodiment will now be explained. As shown, system 220 includes a metal filling fixture 222, an actuator 224, a welding current source 226, an electrode 228, a seal 230, a pressurized gas source 232, a conduit 234, and a valve 235.

Metal filling fixture 222 is provided to fill inflator 18 with a combustible gas, such as hydrogen for example. As shown, fixture 222 includes a sidewall 236 provided to contact an outer surface 206 of end cap 190 to create a metal-to metal seal around aperture 194. As shown, fixture 222 includes a pointed sealing tip 238 at an end 240 of sidewall 236 that extends around the periphery of sidewall 236. The pointed sealing tip 238 is configured to penetrate surface 206 of end cap 190 when fixture 222 is moved downwardly into end cap 190. Sidewall 236 includes an aperture 237 extending therethrough that is coupled to conduit 234. Conduit 234 routes a pressurized combustible gas from pressurized gas source 232 through aperture 237 to an interior region 239 when the valve 235 is in an open operational position. The interior region 239 is defined by a region bounded by sidewall 236, seal 230, and end cap 190. After, entering the interior region 239, the gas flows through the fill aperture 194 into an interior of the enclosure.

Linear actuator 224 is provided to move the metal fill fixture 222 axially either toward end cap 190 to seal against end cap 190, or to move fixture 222 away from end cap 190. Further, linear actuator 224 is provided to move the electrode 228, holding a sealing member 113, towards end cap 190 or away from end cap 190.

Welding current source 226 is provided to route a welding current through electrode 228 to a head portion 128 of sealing member 113. By routing a welding current through head portion 128, head portion 128 is welded to a wall of inflator 18 to seal the fill aperture 194.

Seal 230 is provided to create an airtight seal between sidewall 236 of fixture 222 and electrode 228. Further seal 230 allows the electrode 228 to move axially through an aperture defined by the seal 230.

Figure 11:
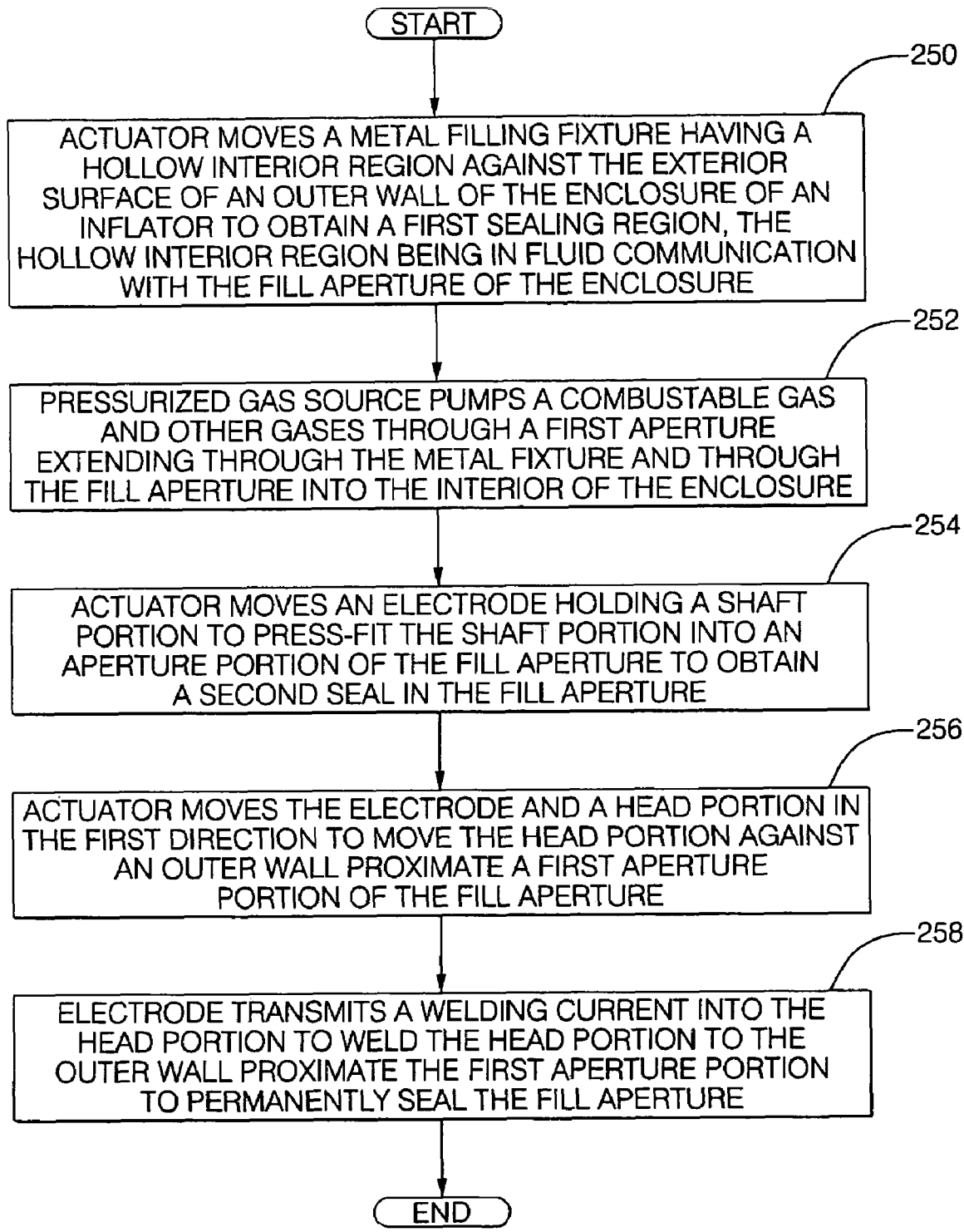
FIG. 11 is a flowchart of a method for filling and sealing an inflator with a combustible gas using the system of FIG. 10.

Referring to FIG. 11, a method for filling in interior of inflator 18 with an inflation gas and for sealing a fill aperture 194 of inflator 18 using system 220 will now be explained. The following steps are exemplary and not intended to be limiting.

At step 250, actuator 224 moves metal filling fixture 222 having hollow interior region 239 against surface 206 of end cap 190 to obtain a first sealing region. As shown, interior region 239 is in fluid communication with the fill aperture 194.

At step 252, pressurized gas source 232 pumps inflation gas through conduit 234 and aperture 237, and further through fill aperture 194 into an interior of the enclosure 112.

At step 254, actuator 224 moves electrode 228 holding the sealing member 113 toward the end cap 190 press-fit the sealing portion 130 into aperture portion 196 of fill aperture 194 to obtain a second seal.

At step 256, actuator 224 further moves electrode 228 and head portion 128 towards the end cap 190 to move the head portion 128 against an outer wall 190 proximate aperture portion 198 of fill aperture 194.

At step 258, the electrode 228 transmits a welding current into head portion 128 to weld head portion 128 to the outer wall of end cap 190 proximate the aperture portion 198 to seal the fill aperture 194.

Figure 10:
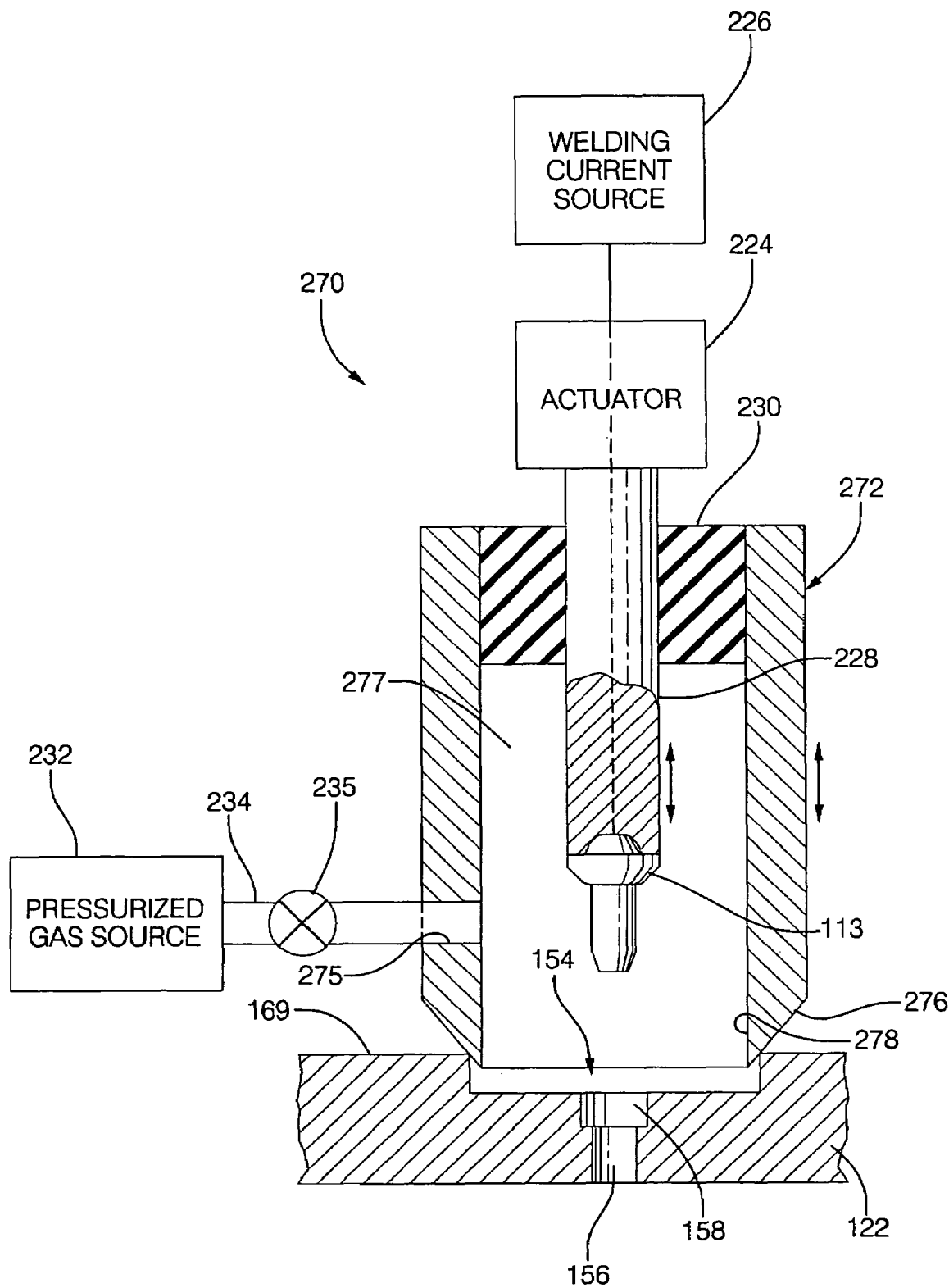
FIG. 10 is a cross-sectional view of a system for filling and sealing an inflator with a combustible gas in accordance with yet another exemplary embodiment of the present invention.

Referring to FIG. 10, a system 270 for filling an interior of inflator 18 with an inflation gas and for sealing an aperture 154 of inflator 18 in accordance with another exemplary embodiment will now be explained. As shown, system 270 includes a metal filling fixture 272, an actuator 224, a welding current source 226, electrode 228, a seal 230, a pressurized gas source 232, a conduit 234, and a valve 235. The primary difference between system 270 and system 220 explained above, is that the metal filling fixture 272 is utilized instead of the metal filling fixture 222.

Metal filling fixture 272 is provided to fill inflator 18 with an inflation gas. As shown, fixture 272 includes a sidewall 274 provided to contact an outer surface 169 of end cap 122 to create a contact-seal with end cap 122. As shown, fixture 272 includes a tapered sealing tip 276 at an end 278 of sidewall 274 that extends around the periphery of sidewall 274. The tapered sealing tip 276 is configured to contact an edge defined by the outer surface 169 and the aperture 154 when fixture 272 is moved downwardly toward end cap 122. Sidewall 274 includes an aperture 275 extending therethrough that is coupled to conduit 234. Conduit 234 routes pressurized gas from pressurized gas source 232 through aperture 275 to an interior region 277 when the valve 235 is in an open operational position. The interior region 277 is defined by a region bounded by sidewall 274, seal 230, and end cap 122. After entering the interior region 277, the gas flows through fill aperture 154 into an interior of the enclosure.

The method for sealing and filling inflator 18 using the system 270, is similar to method for sealing and filling inflator 18 using system 220. The primary difference is that the system 270 utilizes a tapered sealing tip 276 to seal against an edge defined by a fill aperture, whereas the system 220 utilizes pointed sealing tip 238 to obtain a metal-to-metal seal against an end cap around the fill aperture.

Figure 12:
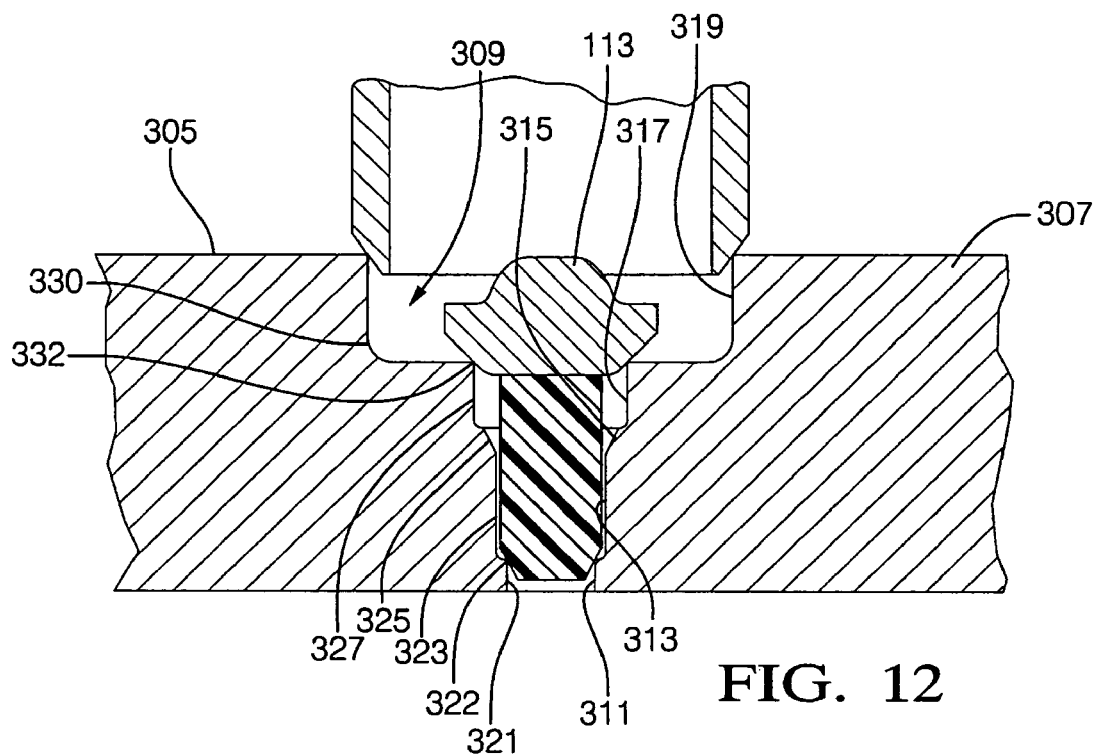
FIG. 12 is an enlarged cross-sectional view of another exemplary embodiment of the present invention.

Referring to FIG. 12, another exemplary initiator endcap (e.g., endcap 305) that can be utilized with inflator 18 is illustrated. The end cap 305 is provided to enclose a second end of the housing portion 114. End cap 305 includes a wall 307 the can be constructed from steel, a metal alloy, or other electrically conductive materials, and is configured to seal against end 121 of enclosure 112. As shown, wall 307 includes a fill aperture 309 extending therethrough. Fill aperture 309 is utilized for allowing a combustible gas as well as inert gases to be stored in enclosure 12.

Fill aperture 309 has several stepped aperture portions with increasing diameters, including an aperture portion 311 having a diameter (D5), an aperture portion 313 having a diameter (D6) where (D6)>(D5), a chamfered aperture portion 315, an aperture portion 317 having a diameter (D7) where (D7)>(D6), and an aperture portion 319 having a diameter (D8) where (D8)>(D7). As shown, an inner side-wall surface 321 defines aperture portion 311, an inner side-wall surface 323 defines aperture portion 313, an inner side-wall surface 325 defines aperture portion 315, an inner side-wall surface 327 defines aperture portion 317, and an inner side-wall surface 330 defines aperture portion 319. The diameter (D5) of the aperture portion 311 is slightly smaller than the diameter of the sealing portion 130. Thus, the tapered portion 131 of the sealing portion 130 can be press-fit against an edge 322 defined by the surfaces 311 and 313 to form a temporary seal for preventing combustible gases from escaping from enclosure 12. The diameter (D6) of the aperture portion 313 is slightly larger than the diameter of the sealing portion 130 to allow portion 130 to easily slide through the aperture portion 313. The tapered aperture portion 315 is provided to guide the sealing portion 130 into the aperture portion 313. As shown, the surfaces 327 and 330 define an edge 332. The tapered portion 134 of the head portion 113 is welded at the edge 332 to form a permanent seal of the aperture 309.

Figure 13:
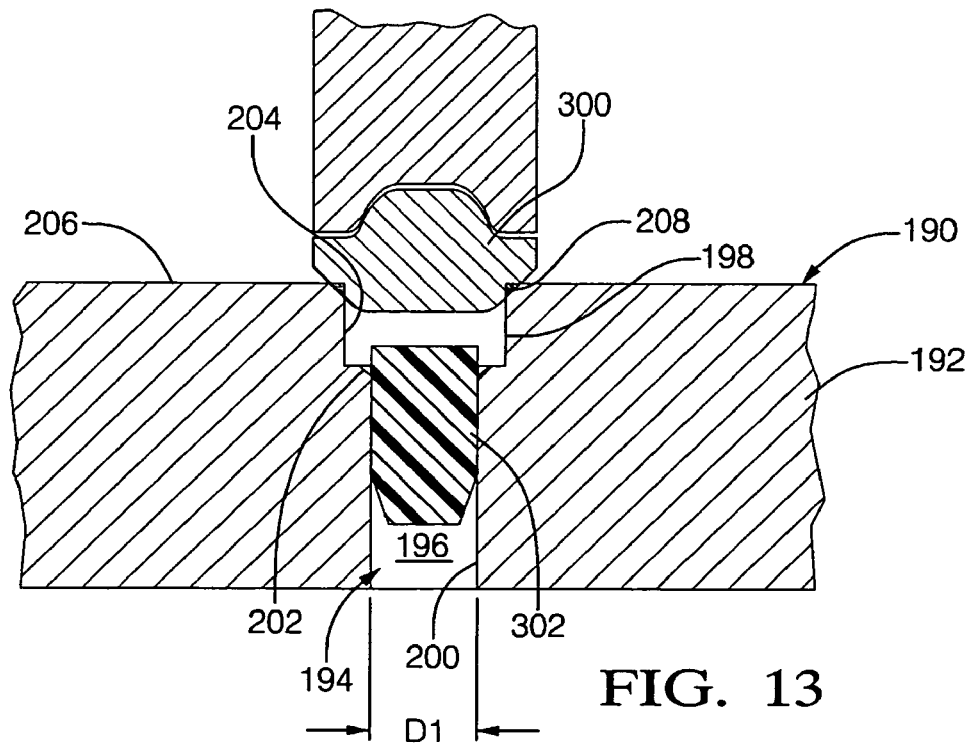
FIG. 13 is an enlarged cross-sectional view of another exemplary embodiment of the present invention.

Referring to FIG. 13, in an alternate exemplary embodiment, the sealing member for sealing the fill aperture of the enclosure 12 can comprise two separate portions (e.g, a head portion 300 and a sealing portion 302. As shown, the sealing portion 302 is press-fit within the aperture portion 196 to form a first temporary seal for preventing combustible gas from escaping from the enclosure 12 to prevent inadvertent ignition of the combustible gas when a separate welding process is used to form a more permanent seal. After the sealing portion 302 is disposed in the aperture portion 196, the head portion 300 is welded to the endcap 192 to permanently seal the fill aperture. It should be noted that the head portion 300 and the sealing portion 302 could be utilized to seal the fill aperture in any of the embodiments disclosed herein.

The present inflator and method for filling and sealing the inflator represent a substantial advantage over known inflators and methods. The inflator utilizes a sealing member having a sealing portion and a head portion that forms first and second seals, respectively, in a fill aperture. The first seal prevents combustible gas from escaping from the inflator. In particular, the first seal prevents the combustible gas from escaping from the inflator and being inadvertently ignited when the head portion is welded to the inflator to form the second seal.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

What is claimed is:

1. A combustible gas inflator, comprising:
   an enclosure configured to receive and store the combustible gas under pressure, the enclosure having an outer wall comprising an exterior surface, an interior surface, and a fill aperture extending therethrough, the fill aperture having a first aperture portion and a second aperture portion, the first aperture portion being proximate the exterior surface and the second aperture portion being proximate the interior surface, wherein the first aperture portion is larger than the second aperture portion; and
   a sealing member configured to seal the fill aperture, the sealing member having a first electrically non-conductive portion and a second electrically conductive portion, said second electrically conductive portion including an extension portion embedded within the first electrically non-conductive portion, the first electrically non-conductive portion being configured to sealingly engage a portion of the second aperture portion and the second electrically conductive portion being configured to sealingly engage a portion of the first aperture portion, wherein the first electrically non-conductive portion seals the combustible gas within the enclosure and the second electrically conductive portion is configured to be welded to the enclosure by a welding process which would ignite the combustible gas if the combustible gas was exposed to the welding process.

2. The inflator of claim 1, wherein the enclosure is constructed from an electrically conductive material.

3. The inflator of claim 1, wherein the enclosure and the second electrically conductive portion of the sealing member are constructed from an identical type of electrically conductive material.

4. The inflator of claim 1, wherein the second electrically conductive portion of the sealing member is welded to the enclosure to form a weld seal, wherein the first electrically non-conductive portion of the sealing member prevents the combustible gas from escaping from the enclosure when the weld seal is being formed.

5. The inflator of claim 1, wherein a periphery of the first electrically non-conductive portion of the sealing member is larger than the periphery of the second aperture portion prior to the first electrically non-conductive portion sealingly engaging the second aperture portion.

6. The inflator of claim 1, wherein the second electrically conductive portion of the sealing member is configured to receive a welding electrode.

7. The inflator of claim 1, wherein the second electrically conductive portion of the sealing member extends along an axis and the second electrically conductive portion further comprises a tapered portion that tapers outwardly away from the axis, the enclosure having a first surface defining the first aperture portion, the tapered portion contacting an edge defined by the first surface and the exterior surface of the outer wall.

8. The inflator of claim 1 wherein the welding process comprises a resistance welding process.

9. A combustible gas inflator, comprising:
   an enclosure configured to receive and store the combustible gas, the enclosure having an outer wall, the outer wall having an exterior surface, an interior surface, and a fill aperture extending therethrough, the fill aperture having a first aperture portion, a second aperture portion, and a third aperture portion, the first aperture portion being proximate the exterior surface, the second aperture portion being proximate the interior surface, and the third aperture portion being disposed between the first and second aperture portions, wherein the first aperture portion is larger than the second aperture portion and the third aperture portion, and the third aperture portion is larger than the second aperture portion; and
   a sealing member configured to seal the fill aperture, the sealing member having a first electrically non-conductive portion and a second electrically conductive portion, said second electrically conductive portion including an extension portion embedded within the first electrically non-conductive portion, the first portion being configured to sealingly engage a portion of the second aperture portion and the second portion being configured to sealingly engage a portion of the third aperture portion, wherein the first portion seals the combustible gas within the enclosure and the second portion is configured to be welded to the enclosure by a welding process which would ignite the combustible gas if the combustible gas was exposed to the welding process.

10. The inflator of claim 9 wherein the second electrically conductive portion of the sealing member extends along an axis, second electrically conductive portion comprises a tapered portion that tapers outwardly away from the axis, the enclosure having a first surface defining the first aperture portion and a second surface defining the third aperture portion, the tapered portion being configured to sealingly engage an edge formed by the first surface and the second surface.

11. A method for sealing an inflator, the inflator having an enclosure configured to receive and store a combustible gas, the enclosure having an outer wall, the outer wall having an exterior surface, an interior surface, and a fill aperture extending therethrough, the fill aperture comprising a first aperture portion proximate the exterior surface and a second aperture portion proximate the interior surface, wherein the first aperture portion is larger than the second aperture portion, the method comprising:
   inserting a first electrically non-conductive portion of a sealing member into the second aperture portion of the fill aperture and creating a press-fit seal therebetween, a second electrically conductive portion including an extension portion embedded within the first electrically non-conductive portion of the sealing member prior to inserting the first electrically non-conductive portion into the second aperture portion, the first portion being inserted after the combustible gas has been stored within the enclosure, wherein the press-fit seal prevents the combustible gas from escaping from the enclosure; and
   welding the second electrically conductive portion of the sealing member to the outer wall of the enclosure by a welding process which would ignite the combustible gas if the combustible gas were exposed to the welding process, wherein a permanent seal is formed between the second electrically conductive portion and the outer wall.

12. The method of claim 11, wherein the press-fit seal is formed by press-fitting the first electrically non-conductive portion having a greater diameter than the second aperture portion into the second aperture portion.

13. The method of claim 11, further comprising:
   moving the second electrically conductive portion of the sealing member against the enclosure proximate the first aperture portion by an electrode making contact with the second electrically conductive portion of the sealing member; and applying electrical current through the electrode and the second electrically conductive portion of the sealing member to weld the second electrically conductive portion of the sealing member to the enclosure.

14. The method of claim 11, wherein the enclosure is constructed from an electrically conductive material.

15. The method of claim 11, wherein the second electrically conductive portion of the sealing member is configured to receive a welding electrode.

16. An inflator sealed by the process of claim 11.

17. A method for sealing an inflator, the inflator having an enclosure configured to receive and store a combustible gas, the enclosure having an outer wall, the outer wall having an exterior surface, an interior surface, and a fill aperture extending therethrough, the fill aperture having a first aperture portion proximate the exterior surface and a second aperture portion proximate the interior surface and a third aperture portion disposed between the first and second aperture portions, wherein the first aperture portion is larger than the second aperture portion and the third aperture portion, and the third aperture portion is larger than the second aperture portion, the method comprising:

inserting a first electrically non-conductive portion of a sealing member into the second aperture portion of the fill aperture after the combustible gas has been stored within the enclosure, a second electrically conductive portion including an extension portion embedded within the first electrically non-conductive portion of the sealing member prior to inserting the first electrically non-conductive portion into the second aperture portion, wherein the first electrically non-conductive portion prevents the combustible gas from escaping from the enclosure; and welding the second electrically conductive portion of the sealing member to the outer wall proximate the third aperture portion, wherein a permanent seal is formed between the second electrically conductive portion and the outer wall.

18. An inflator sealed by the method of claim 17.

19. A combustible gas inflator, comprising:

an enclosure configured to receive and store the combustible gas, the enclosure having an outer wall, the outer wall having an exterior surface, an interior surface, and a fill aperture extending therethrough, the fill aperture having a first aperture portion, a second aperture portion, and a third aperture portion, the first aperture portion being proximate the exterior surface, the second aperture portion being proximate the interior surface, and the third aperture portion being disposed between the first and second aperture portions, wherein the first aperture portion is larger than the second aperture portion and the third aperture portion, and the third aperture portion is larger than the second aperture portion;

a sealing member configured to seal the fill aperture, the sealing member having a first portion and a second portion, the first portion being configured to sealingly engage a portion of the second aperture portion and the second portion being configured to sealingly engage a portion of the third aperture portion, wherein the first portion seals the combustible gas within the enclosure and the second portion is configured to be welded to the enclosure by a welding process which would ignite the combustible gas if the combustible gas was exposed to the welding process;

wherein the second portion extends along an axis, second portion comprises a tapered portion that tapers outwardly away from the axis, the enclosure having a first surface defining the first aperture portion and a second surface defining the third aperture portion, the tapered portion being configured to sealingly engage an edge formed by the first surface and the second surface.

* * * * *